July 27, 1965

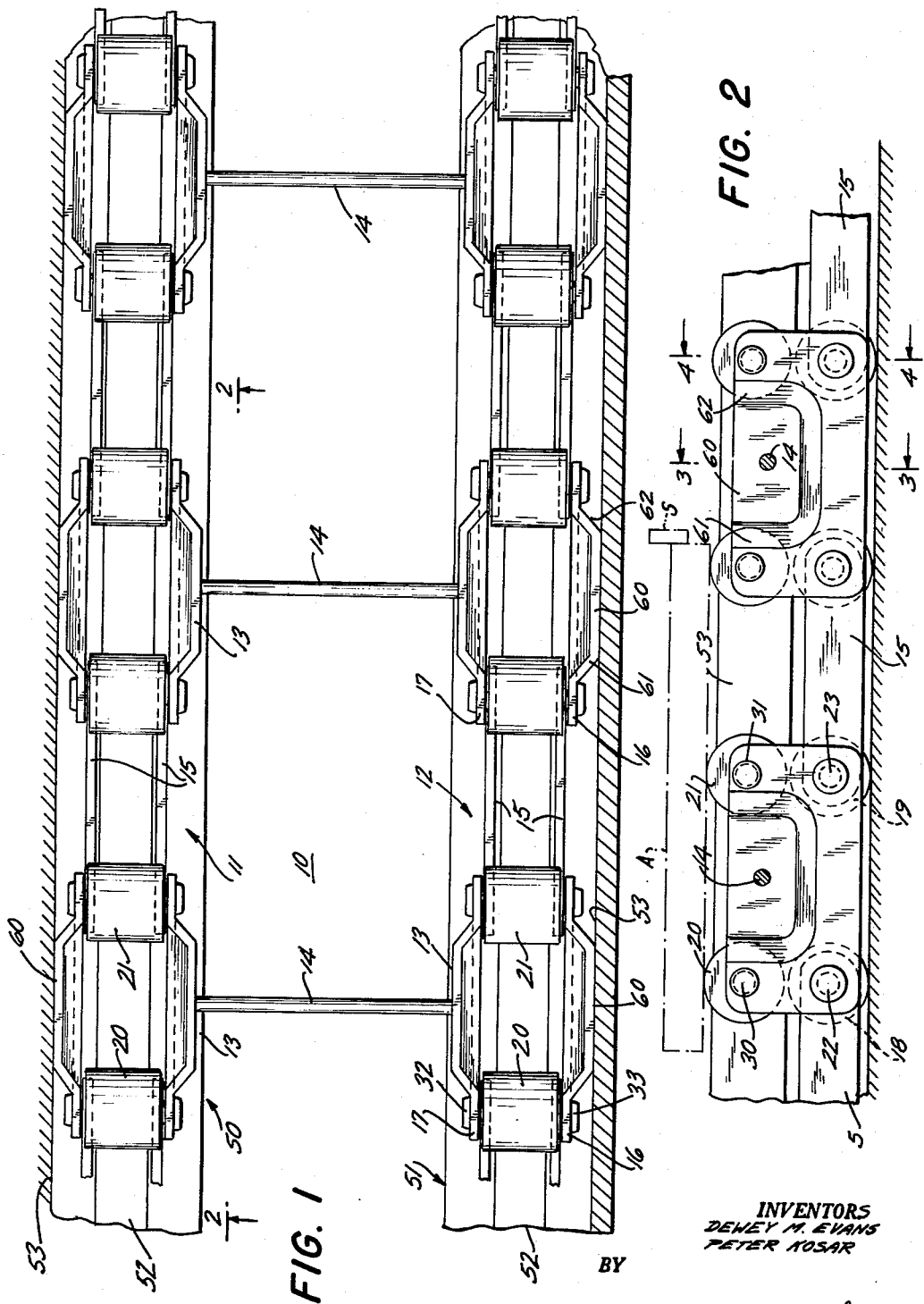

D. M. EVANS ETAL 3,197,020

CONVEYOR CHAIN LINK

Filed April 16, 1962

INVENTORS
DEWEY M. EVANS
PETER KOSAR

BY
Curtis, Morris & Safford
ATTORNEYS

United States Patent Office 3,197,020
Patented July 27, 1965

3,197,020
CONVEYOR CHAIN LINK
Dewey M. Evans, Pinckney, and Peter Kosar, Garden City, Mich., assignors to Ajem Laboratories, Inc., Livonia, Mich., a corporation of Michigan
Filed Apr. 16, 1962, Ser. No. 187,716
7 Claims. (Cl. 198—183)

The present invention relates to conveyors and more particularly to endless conveyors of the type used in industrial plants to convey articles to or through a production line.

Many varieties of chain conveyors are used in industry for handling parts in many different phases of automation. Such chain conveyors have a wide variety of sizes, structure and method of use. Some comprise simple linkages which operate over rollers, cog wheels, idler rollers and chain guide rails while others are of more complicated construction with specially designed structures and driving mechanisms. Sometimes these chain assemblies are installed in overhead suspensions, or they may be operated at near production level as in automobile plants. The chains may be of extra heavy material to provide the strength necessary not only to carry and handle the parts, but to support long reaches as they move in a path which may vary from a straight-away to tortuous routes through a plant.

In some types of chain conveyors the individual links may be provided with rollers movable along metal tracks to support the weight of the conveyor and articles being conveyed. In installations where a conveyor is used to advance workpieces to successive stations, the conveyor must be operated intermittently to start and stop the workpieces. Any relative movement between the conveyor and workpieces, due to inertia or momentum as the conveyor is started and stopped, may scratch finished surfaces.

Some of the more simple chains comprise a standard linkage having steel pins extending through holes in the links in a direction at right angles to the direction of motion of the chain. The sides of the links may be maintained parallel at a fixed distance apart by the use of spacers so that the ends of the pins project beyond the sides of the links, and in some cases the pins may move relative to the links. One of the disadvantages of such constructions is that the ends of the pins extending outwardly beyond the sides of the links are dangerous in that they may catch on clothing or obstructions, and tend to scratch, wear and dig into metal guide rails at the side of the path of the conveyor. Due to the excessive wear, both pins and guide plates require replacement and maintenance and sometimes may even cause breakage of the chain if a pin seizes on a roughened surface of the guide plate.

Many times the guide rails are spaced laterally from the ends of the pins to avoid the above mentioned difficulties, but when this is done the installation becomes sloppy and subject to considerable side motion. With too great a side motion, the conveyor or particular machine using the conveyor cannot function at its best. Thus, a good control of the exact lateral position of the chain, or links thereof, is not attained with conventional conveyor chain constructions having the ordinary cross pin connections.

One of the objects of the present invention is to provide an improved link construction for conveyor chains which maintains an accurate control of the position of the chain during operation.

Another object is to provide a chain link construction for a continuously moving conveyor which permits a workpiece to be stopped thereon without damage to finished surfaces and provides a smooth bearing surface for engagement with guide plates to reduce wear, damage to and maintenance of the cooperating parts of the chain and guide tracks.

Still another object is to provide a conveyor chain of the type indicated which is of simple and compact construction, economical to manufacture and one which is safe and reliable in operation to perform its intended function.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a plan view of a section of a conveyor which incorporates the novel features of the present invention;

FIGURE 2 is a side elevational view of several links of the conveyor chain illustrated in FIGURE 1 to show the upper and lower pairs of rollers on alternate links which are adapted to roll on guide tracks and articles being conveyed;

Figure 3:
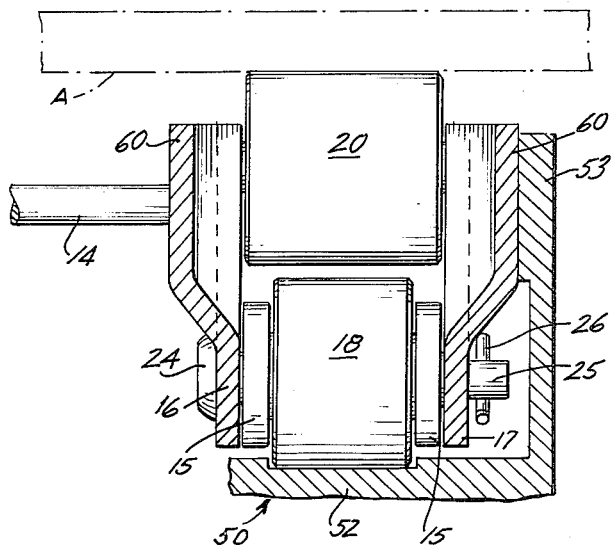
FIGURE 3 is a transverse sectional view taken on line 3—3 of FIGURE 2 to show the bosses on the side plates of the links for sliding engagement with vertical guide plates.

Referring now to the drawings, the invention is shown applied to a conveyor 10 for supporting articles to be conveyed comprising spaced chains 11 and 12 with the corresponding alternate links 13 of the spaced chains connected by rods 14. It is to be understood, however, that the invention can be used on a single chain conveyor, such as 11 or 12, or on other types of chain conveyors than the one illustrated, or the rods may extend between alternate links connecting the links 13, or the rods connecting the corresponding links on the separate chains may be extensions of the pivot pins.

Figure 4:
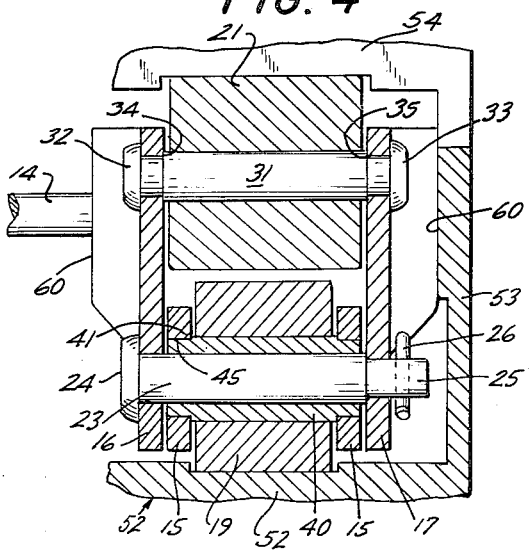
FIGURE 4 is a transverse sectional view taken on line 4—4 of FIGURE 2 to show the construction of the links for mounting the upper and lower rollers therein.

In the illustrated embodiment, each conveyor chain 11 and 12 comprises the links 13 alternating with strap links 15. Each link 13 has spaced side plates 16 and 17 with lower and upper pairs of spaced rollers 18, 19 and 20, 21 between the side plates and projecting below and above the side plates of the link. The pair of lower rollers 18 and 19 are mounted to rotate on removable pins 22 and 23, see FIGURE 4, extending transversely between the side plates. As shown in FIGURE 4, pins 22 and 23 have a head 24 at one end and a reduced end 25 extending through the other side plate 17 and the pins are retained in the links by means of wires or cotter pins 26 extending through the reduced ends. The upper pair of rollers 20 and 21 are mounted on pins 30 and 31 having reduced ends projecting through and beyond the side plates 16 and 17 and upset to provide heads 32 and 33.

The side plates 16 and 17 of each link 13 are held in spaced relation by any suitable spacing means. In the illustrated embodiment, the reduced ends of pins 30 and 31 provide shoulders 34 and 35 engaging the side plates 16 and 17 on one side and the upset heads 32 and 33 engaging the other sides of the plates to rigidly connect the side plates in spaced relation in an integral structure. The upper pair of rollers 20 and 21 are of less axial length than the distance between the shoulders 34 and 35 and rotate freely on the pins between the side plates 16 and 17. The lower pair of rollers 18 and 19 are of less axial length than rollers 20 and 21 and each is mounted to rotate on the central part of a sleeve 40, see FIGURE 4, surrounding the pin 22 or 23 and having reduced annular bearing surfaces 41 at its ends.

The alternate links 13 are connected by pairs of the spaced strap links 15, see FIGURES 1 and 4. The end of each strap link 15 has a circular opening 45 which closely fits a reduced hub 41 at the end of the sleeve 40 of its respective adjacent link 13. Thus, the alternate links 13 are connected by a pair of strap links 15 extending between the pins 22 and 23 of adjacent links at opposite sides of a lower roller 18 or 19 to form a continuous articulated chain 11 or 12.

The separate chains 11 and 12 of the conveyor 10, see FIGURES 1 to 3, ride on spaced tracks 50 and 51 each having a horizontal guide portion 52 engaged by the lower pair of rollers 18 and 19 and vertical guide portions 53 extending upwardly from the horizontal guide portions. The upper pair of rollers 20 and 21 may provide an antifriction support for articles A as illustrated in FIGURE 3, or may engage an overhead track 54, see FIGURE 4, which also may have both horizontal and vertical guides. As shown in FIGURE 1, the horizontal guide portions 52 of tracks 50 and 51 receive the bearing load to support the weight of the chain and articles carried thereby, and vertical guides 53 at the sides of the conveyor chains 11 and 12 control the lateral movement of the chains of the conveyor 10 to accurately position articles carried by the conveyor.

In accordance with the present invention the links 13 are each provided with a bearing surface 60 on at least one side for sliding engagement with the vertical guides 53 at a location beyond the ends of the pins 22, 23 and 30, 31. The bearing surfaces 60 on the alternate links 13 are so constructed and arranged as to control the side-play of the conveyor chains 11 and 12 as well as reduce wear on the links and guides.

The bearing surfaces 60 on the links 13 are in the form of bosses projecting from the side plates 16 and 17. While the bearing surface 60 are required only on one side of the links 13 they are usually provided on both sides for convenience in manufacture. The laterally projecting bearing surface or boss 60 may be formed by casting, pressing or machining the side pates 16 and 17. In the illustrated embodiment the sides plates 16 and 17 are formed of sheet metal stock and the bosses are formed by pressing. The flat bearing surfaces 60 of the pressed plates 16 and 17 extends through a substantial portion of the length of the plates with inclined surfaces 61 and 62 projecting laterally outward from the narrower dimension of the links to the flat bearing surfaces. Thus, each of the side plates 16 and 17 are of identical construction, but reversed to each other, and the inner sides of corresponding links are connected by the rod 14 to form the conveyor 10. The rods 14 together with the pins 30 and 31 then act as spacers to position the bearing surfaces 60 closely adjacent the vertical guides 53 at opposite sides. Side plates 16 and 17 of the links 13 and the cooperating vertical guide plates 53 may be made of suitable material to reduce wear to a minimum and may be suitably lubricated to further reduce wear. For example, the cooperating parts may be made of cast iron and steel and be lubricated, or may be made of a metal, such as steel, and a plastic, such as nylon, and operate without lubrication. One form of construction having now been described in detail, the mode of operation is next explained.

Assuming for purposes of description that each link 13 is first fabricated by assembling the upper pair of rollers 20 and 21 between the side plates 16 and 17, and then heading the ends of the pins 30 and 31 illustrated in FIGURE 4 to unite the plates in spaced relation in an integral structure. The main links 13 and strap links 15 are then assembled by mounting the lower rollers 18 and 19 of a link on sleeves 40, see FIGURE 4, mounting the ends of a pair of strap links 15 in the hubs 41 at the end of the sleeves, inserting the assembled rollers, sleeves and strap links between the side plates 16 and 17 and then uniting the assembly by inserting pins 22 and 23 through the sleeves 40 of the adjacent links. The corresponding links 13 of the separate chains 11 and 12 will have been connected by the rods 14 and the conveyor 10 of assembled chains 11 and 12 is mounted in the tracks 50 and 51 to extend throughout the course which it is to follow.

Articles A supported on the upper rollers 20 and 21 of a continuously moving conveyor 10 may then be moved toward or through an assembly line by the conveyor. In another application the conveyor may be operated continuously to convey articles A to any intermittently operating machine for receiving and processing the articles. In any of these applications the lower pair of rollers 18 and 19 roll along the horizontal guide portion 52 of the tracks 50 and 51 to support the weight of the chain and articles being conveyed. The bosses 60 projecting laterally from the sides of the links 13 at opposite sides of the chains 11 and 12 bear against the vertical side plates 53 to limit the side-play of the conveyor. As will be observed in FIGURE 3, the bosses 60 project laterally beyond the ends of the pins 22, 23, 30 and 31 to prevent the ends of the pins from engaging the vertical guides 53 of the guide tracks 50 and 51, while at the same time providing a relatively wide flat bearing surface having beveled edges 61 and 62 at each end.

When the conveyor 10 is operated continuously to convey articles A to an intermittently operating machine for processing, the foremost article engages stop S as illustrated in FIGURE 2. The conveyor 10 may continue to move relative to the article and the upper rollers 20 and 21 rotate as they move along the bottom of the article without marring or scratching the bottom surface thereof. In this type of application, the conveyor 10 actually provides a temporary storage area for articles A held by stop S which may be released intermittently to deliver articles as needed by the machine in which they are processed. In such an arrangement the release of articles from the conveyor may be controlled automatically by the machine or timing devices with which it is used, or by timing devices, etc., used in conjunction with the conveyor and machine.

In other installations, the upper pair of rollers 20 and 21 may engage the guide surface of an upper horizontal track 54, see FIGURE 4. It will be understood that track 54 would have guide plates, like those already described, to guide the conveyor and limit its side-play.

It will now be observed that the present invention provides a conveyor chain which reduces wear, damage to and maintenance of cooperating parts of the conveyor chain and guide tracks. It will further be observed that the present invention provides a link construction for a conveyor chain having a smooth bearing surface extending over a substantial area for engagement with guide plates to maintain an accurate control of the position of the conveyor during operation. It will still further be observed that the present invention provides a conveyor chain of the type indicated which is of simple and compact construction, economical to manufacture and one which is safe and reliable in operation to perform its intended function.

While a single embodiment of the present invention is herein illustrated and described, it will be understood that changes may be made in the construction and arrangement of elements without departing from the spirit or scope of the invention. For example, the bosses may extend throughout the length of the side plates between the upper and lower pins; or the bosses may have other shapes. Therefore, without limitation in this respect, the invention is defined by the following claims.

We claim:

1. An endless conveyor of the type having a succession of pivotally connected links movable in a continuous path in tracks with bottom and opposed side plates, the combination in such a conveyor of pins extending through the ends of adjacent links to pivotally connect the links, alternate links having lower and upper rollers mounted thereon to rotate on axes extending laterally of the links, the lower rollers projecting below the links and adapted to roll along the bottom of the tracks, the upper rollers projecting upwardly above the links to support articles to be conveyed, and said alternate links having bosses projecting outwardly beyond the ends of the pins to provide bearing surfaces extending longitudinally of the links for sliding engagement with the side plates of the track.

2. An endless conveyor in accordance with claim 1 in which a movable stop is provided adjacent the conveyor for engagement by an article being conveyed whereby to provide a storage area for articles for intermittent delivery therefrom by moving the stop from engagement therewith.

3. An endless conveyor for supporting and conveying articles comprising a plurality of chains of successive links, the alternate links of each chain comprising spaced side plates having bosses intermediate the ends projecting laterally beyond the end portions, pins extending through the ends of the side plates of each of said alternate links to form the links and through adjacent links to pivotally connect the links, alternate links of said plurality of chains having lower and upper rollers mounted thereon to rotate on axes extending laterally of the links, the lower rollers projecting below the links, the upper rollers projecting upwardly above the links to support articles to be conveyed, means for limiting the lateral movement of the pins, a track engaged by said lower rollers for supporting the chains for movement in a predetermined path, guide plates to limit the movement of the chains sidewise, and said bosses on the alternate links projecting laterally beyond the ends of the pins to provide a bearing surface for sliding engagement with the guide plates to limit sidewise movement of the chain.

4. An endless conveyor in accordance with claim 2 in which the alternate links are connected by strap links pivotally connected to the pins adjacent the opposite ends of the alternate links, and the lower rollers being mounted on the pins for pivotally connecting the links.

5. An endless conveyor in accordance with claim 4 in which the ends of the strap links being positioned between the side plates and sides of the lower roller, respectively.

6. An endless conveyor in accordance with claim 2 in which the upper rollers are mounted on pins extending between the side plates of the alternate links and project upwardly beyond opposite sides of the link, and said pins for the upper rollers having reduced ends extending through the side plates and having up-set heads at the exterior thereof to attach the plates to each other to form the links.

7. An endless conveyor in accordance with claim 2 comprising means connecting corresponding links of the plurality of chains, the tracks for the chains having horizontal and vertical guide surfaces, and the bosses projecting laterally from the opposite sides of connected links for sliding engagement with the vertical guide surfaces of the tracks.

References Cited by the Examiner
UNITED STATES PATENTS

| | | | |
|---|---|---|---|
| 722,689 | 3/03 | Frink | 198—183 |
| 1,996,586 | 4/35 | Meyer | 198—137 |
| 2,159,396 | 5/39 | Miller | 74—245 |
| 2,976,981 | 3/61 | Peras | 198—127 |

SAMUEL F. COLEMAN, *Primary Examiner.*

WILLIAM B. LA BORDE, ERNEST A. FALLER, JR.,
*Examiners.*